US011012830B2

(12) United States Patent
Sharaga et al.

(10) Patent No.: US 11,012,830 B2
(45) Date of Patent: May 18, 2021

(54) AUTOMATED ACTIVATION AND ONBOARDING OF CONNECTED DEVICES

(71) Applicant: ALTAIR SEMICONDUCTOR LTD., Hod Hasharon (IL)

(72) Inventors: Avishay Sharaga, Beit Nehemya (IL); Ilan Reingold, Givataim (IL); Yigal Bitran, Ramat HaSharon (IL); Gilad Aloni, Heirut (IL)

(73) Assignee: SONY SEMICONDUCTOR ISRAEL LTD., Hod Hasharon (IL)

( * ) Notice: Subject to any disclaimer, the term of this patent is extended or adjusted under 35 U.S.C. 154(b) by 65 days.

(21) Appl. No.: 16/297,782

(22) Filed: Mar. 11, 2019

(65) Prior Publication Data

US 2019/0306673 A1 Oct. 3, 2019

Related U.S. Application Data

(60) Provisional application No. 62/651,168, filed on Apr. 1, 2018.

(51) Int. Cl.

| | |
|---|---|
| ***H04W 4/24*** | (2018.01) |
| ***H04M 15/00*** | (2006.01) |
| ***H04L 12/14*** | (2006.01) |
| ***H04W 60/00*** | (2009.01) |
| ***H04W 8/24*** | (2009.01) |

(Continued)

(52) U.S. Cl.

CPC .......... *H04W 4/24* (2013.01); *H04L 12/1403* (2013.01); *H04M 15/745* (2013.01); *H04W 4/50* (2018.02); *H04W 8/24* (2013.01); *H04W 60/00* (2013.01); *H04L 67/12* (2013.01)

(58) Field of Classification Search

CPC ......... H04W 4/24; H04W 60/00; H04W 8/24; H04W 4/50; H04M 15/745; H04L 12/1403

See application file for complete search history.

(56) References Cited

U.S. PATENT DOCUMENTS

2013/0252583 A1* 9/2013 Brown ................ H04L 63/0807 455/411
2014/0098671 A1* 4/2014 Raleigh ................. G06Q 40/12 370/235

(Continued)

OTHER PUBLICATIONS

GSM Association Official Document SGP.21—RSP Architecture, Version 2.2, pp. 1-95, Sep. 1, 2017.
Ben-Simon et al., U.S. Appl. No. 16/432,956, filed Jun. 6, 2019.

*Primary Examiner* — Andrew Lai
*Assistant Examiner* — Sumitra Ganguly
(74) *Attorney, Agent, or Firm* — Kligler & Associates Patent Attorneys Ltd

(57) ABSTRACT

A communication device includes a modem and circuitry. The modem communicates with a cellular network that is linked to a data network to which one or more target servers are coupled. The circuitry is configured to hold a token that identifies the communication device for assignment to a selected service plan in a management server of the cellular network, to trigger, based on the token, an onboarding request to the management server for assigning the selected service plan to the communication device, and, after the selected service plan has been assigned to the communication device in the management server, to communicate with a target server, via the cellular network and over the data network, in accordance with the selected service plan.

20 Claims, 3 Drawing Sheets

20
32
UE
28
MNG SERVER
40
48
APP CLOUD
52
APP SERVER
CELLULAR NETWORK
22
44
56
BS
30
CONNECTED DEVICE (IoT)
24
DATA NETWORK (INTERNET)
OWNER OF CONNECTED DEVICES (USER)
Wi-Fi AP
58
ONBOARDING REQUEST
TOKEN MNG SERVER (PORTAL)
64
TOKEN SENT FOR ONBOARDING
TOKEN SERVER
TOKEN PROVIDED TO IoT OFFLINE
66
60

(51) Int. Cl.
*H04W 4/50* (2018.01)
*H04L 29/08* (2006.01)

(56) References Cited

U.S. PATENT DOCUMENTS

2015/0071216 A1 3/2015 Ilsar et al.
2016/0212099 A1 7/2016 Zou et al.
2016/0374134 A1* 12/2016 Kweon .................. H04W 4/60
2017/0346848 A1 11/2017 Smith et al.
2019/0296983 A1* 9/2019 Clark .................. H04L 41/0853

* cited by examiner

AUTOMATED ACTIVATION AND ONBOARDING OF CONNECTED DEVICES

CROSS-REFERENCE TO RELATED APPLICATIONS

This application claims the benefit of U.S. Provisional Patent Application 62/651,168, filed Apr. 1, 2018, whose disclosure is incorporated herein by reference.

TECHNICAL FIELD

Embodiments described herein relate generally to communication systems, and particularly to methods and systems for automated activation and onboarding of wireless connected devices.

BACKGROUND

A connected device is typically assigned in a cellular network to a service plan that grants the connected device with access privileges to various services via the cellular network. Such privileges typically include the service level to which the device is entitled, such as bandwidth, amount of data, SMS and Voice services, and the like. A connected device that is linked to a service plan in the cellular network is regarded to as being "onboarded." The service plan is typically linked to a user account that includes a definition of the service plan, billing information and the like. A connected device may comprise, for example, an Internet of Things (IoT) device that connects to the Internet via the cellular network.

SUMMARY

An embodiment that is described herein includes a communication device that includes a modem and circuitry. The modem communicates with a cellular network that is linked to a data network to which one or more target servers are coupled. The circuitry is configured to hold a token that identifies the communication device for assignment to a selected service plan in a management server of the cellular network, to trigger, based on the token, an onboarding request to the management server for assigning the selected service plan to the communication device, and, after the selected service plan has been assigned to the communication device in the management server, to communicate with a target server, via the cellular network and over the data network, in accordance with the selected service plan.

In some embodiments, the circuitry is configured to store the token in a memory of the communication device, and to trigger the onboarding request by sending the token stored in the memory over the cellular network, upon a first connection attempt to the cellular network. In other embodiments, the circuitry is configured to trigger the onboarding request by sending the token over the cellular network using a preassigned service plan, subsequently replaced by the selected service plan. In yet other embodiments, the data network includes a token server that generates the onboarding request for the management server, and the circuitry is configured to trigger the onboarding request by sending the token to the token server.

In an embodiment, the circuitry is configured to send the token to the token server via both the cellular network and the data network. In another embodiment, the circuitry is configured to send the token to the token server via the data network using a wired link or a wireless communication link other than the cellular network.

There is additionally provided, in accordance with an embodiment that is describe herein, a method including, in a communication device that communicates with a cellular network that is linked to a data network to which one or more target servers are coupled, holding a token that identifies the communication device for assignment to a selected service plan in a management server of the cellular network. Based on the token, an onboarding request is triggered to the management server for assigning the selected service plan to the communication device. After the selected service plan has been assigned to the communication device in the management server, communication with a target server is carried out, via the cellular network and over the data network, in accordance with the selected service plan.

There is additionally provided, in accordance with an embodiment that is described herein, a token server that includes and interface, a memory and a processor. The interface connects the token server to a data network coupled to a cellular network including a management server that assigns to communication devices respective service plans. The processor is configured to receive a token request for providing a token that specifies a predefined quota of communication devices for assignment to a selected service plan in the management server, and in response to the token request, to send a respective token. Upon receiving an indication that a given token, previously provided in response to a token request, is to be used by the management server for assigning the selected service plan to a given communication device, the processor is configured to store in the memory, in association with the given token, an identifier of the given communication device and the selected service plan.

In some embodiments, the processor is configured to receive the indication by receiving the given token from the given communication device, and based on the given token, to send an onboarding request to the management server for assigning the selected service plan to the given communication device. In other embodiments, the processor is configured to receive the indication by receiving from the management server a notification that the given communication device has been assigned in the management server to the service plan specified by the given token, and in response to the notification, to store the identifier of the given communication device in association with the given token, in the memory. In yet other embodiments, the processor is configured to receive a request for modifying an attribute in the selected service plan currently assigned to the given communication device, and in response to the request, to modify in the memory, the attribute in the selected service plan of the given communication device, and to request the management server to modify the attribute in the selected service plan assigned to the given communication device.

In an embodiment, the processor is configured to receive a request for canceling the selected service plan currently assigned to the given communication device, and in response to the request, to remove in the memory, an association between the given token and the given communication device, and to request the management server to remove an assignment of the selected service plan to the given communication device.

There is additionally provided, in accordance with an embodiment that is described herein, a method, including, in a token server that connects to a data network coupled to a cellular network including a management server that assigns to communication devices respective service plans, receiving a token request for providing a token that specifies a predefined quota of communication devices for assignment to a selected service plan in the management server, and in response to the token request sending a respective token. Upon receiving an indication that a given token, previously provided in response to a token request, is to be used by the management server for assigning the selected service plan to a given communication device, an identifier of the given communication device and the selected service plan are stored in a memory, in association with the given token.

There is additionally provided, in accordance with an embodiment that is described herein, a method for onboarding, including, registering in a management server of a cellular network a communication device that requires onboarding. A token provided by a token server connected to a data network that is coupled to the cellular network is embedded in the communication device, the token identifies a selected service plan to be assigned to the communication device in the management server. The embedded token is sent to the token server, by the communication device. The management server, is requested by the token server, to onboard the communication device by assigning the selected service plan to the communication device in the management server. Communication is carried out, by the communication device, with an application server accessible via the data network, using the assigned service plan.

In some embodiments, registering the communication device includes assigning to the communication device a default service plan, and requesting to onboard the communication device includes requesting the management server to replace the default service plan with the selected service plan.

These and other embodiments will be more fully understood from the following detailed description of the embodiments thereof, taken together with the drawings in which:

DETAILED DESCRIPTION OF EMBODIMENTS

Overview

Figure 1:
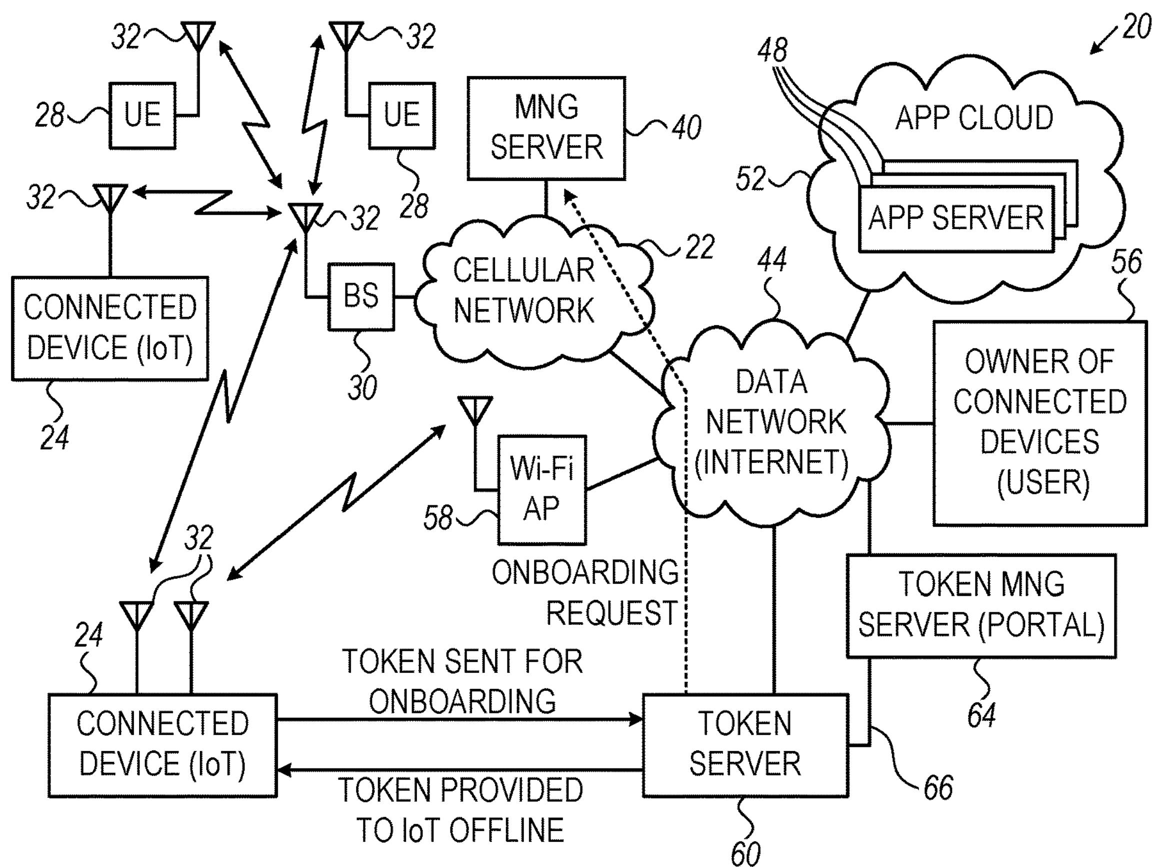
FIG. 1 is a block diagram that schematically illustrates a combined communication system supporting automated activation and onboarding of connected devices, in accordance with an embodiment that is described herein.

Connected devices of various types typically access a data network such as the Internet via a cellular network. For connecting to the cellular network, the connected device should typically be linked to a service plan offered by the cellular network, including a Service Level Agreement (SLA), a payment method and optionally services provided by an application cloud. The connected device additionally holds network parameters, credentials and personalized information, which the cellular network uses for identifying, authenticating and validating the connected device.

In the context of the present disclosure and in the claims, the association between a connected device and a service plan in the cellular network is referred to as "onboarding." In addition, the process of provisioning a connected device with a unique identifier (ID) and with validation information for connecting to the cellular network is referred to herein as "personalization" of the connected device. Further additionally, the process of registering the ID of a connected device in a management server of the cellular network is referred to herein as "activation" of the connected device. The description that follows refers mainly to wireless connected devices, which are also referred to herein simply as "connected devices" for brevity.

Embodiments that are described herein provide systems and methods for automated activation and onboarding of connected devices. The disclosed embodiments are useful, for example, for onboarding connected devices that are not equipped with a friendly user interface such as a keyboard and display. The disclosed embodiments additionally enable efficient mass onboarding of connected devices, freeing the user from the need to onboard each device individually.

Conventional activation and onboarding involves the coordination among various entities, including the operator of the cellular network, in some cases—the manufacturer of the connected device, and the end user. Such complex coordination is not scalable for mass deployments of connected devices, and slows down wide-spread deployment of connected device technology.

Connected devices are typically produced in mass numbers. Moreover, a common hardware module is (i) typically used in implementing connected devices that are later distributed to many different end users, and (ii) may be used in many different applications that require different SLAs. Therefore, at production time, the end user and actual service plan are not yet known. Onboarding is thus not applicable during production of the connected device, but only after the end user engages with a service plan offered by the operator of the cellular network.

The end user could, in principle, perform onboarding of each connected device prior to first connection to the cellular network. This process however, requires knowledge of the identities of the connected devices upon engaging with a service plan, which identities may be unavailable. Even when the identities can be collected, such strategy requires high expertise and is typically not scalable for a mass number of connected devices.

The disclosed embodiments automate the process of activation and onboarding. In some embodiments, the connected devices are first activated by engaging the connected devices to a default service plan that is common to all end users. The connected devices are later onboarded, e.g., upon first connection, by automatically replacing the default service plan with the actual service plan selected by a given end user for his or her connected devices. In some embodiments, a connected device is registered in the cellular network without being assigned to any service plan. In such embodiments, the device may request onboarding using a Wi-Fi modem, for example.

In the disclosed embodiments, a connected device is provisioned prior to onboarding, using an out of band process, with (i) personalized information and (ii) an onboarding token. The cellular network comprises a management server in which identifiers of connected devices are linked to service plans.

The personalized information may comprise, for example, an International Mobile Subscriber Identity (IMSI) and a key, which are held, for example, in a Subscriber Identification Module (SIM) within the connected device. The token specifies the actual service plan to which the connected device should be linked, when onboarded. The token typically specifies additional parameters such as the maximal number of connected devices that may be onboarded using this token, the user account in the cellular network and the like.

In some embodiments, the token is provided, upon request, by a token server coupled to the data network. A token request may be generated in response to the end user selecting a service plan for a quota of connected devices, e.g., using a portal service. The token provided is initially unrelated to any specific connected device.

In some embodiments, the connected device uses its personalized information for connecting to the cellular network, prior to onboarding, e.g., upon first connection attempt. At this stage, the connected device can only establish basic connectivity to the cellular network using a default service plan preassigned to the connected device in the management server.

In some embodiments, after establishing basic connectivity, the connected device transmits the token to the token server, using the default service plan. In response to receiving the token, the token server stores, in a local database, the identifier of the connected device in association with the token, and requests the management server to onboard the connected device. Following onboarding, the connected device has access to various services in accordance with the assigned service plan.

In some embodiments, instead of establishing default connectivity in the cellular network the connected device transmits the token to the token server, for onboarding, using a communication link other than the cellular network. Such a communication link may be wireless such as a Wi-Fi or Bluetooth link, or a wired link.

In some embodiments, the token server supports managing connected devices that are already onboarded. For example, the token server receives, from the end user, e.g., via the portal that used for purchasing the token, a control massage for modifying one or more attributes in the service plan currently assigned to a connected device, or for canceling onboarding of a connected device. In response to a control message, the token server updates its data base, and sends a request to the management server to modify the service plan or cancel onboarding of the relevant connected device. When removing an onboarded device, the available quota of the relevant token is optionally updated (e.g., increased).

In the disclosed techniques, the end user may select a service plan for a predefined quota (i.e., a bulk number of) of connected devices, independently of the actual individual identities of the connected devices that will later be onboarded and linked to that service plan. The disclosed embodiments support automated activation and onboarding of connected devices, and are therefore suitable for large scale management of low-complexity and "dumb" connected devices. The disclosed embodiments ease the supply chain and improve the value chain in the delivery and field-deployment of connected devices owned by a large number of different end users.

System Description

FIG. 1 is a block diagram that schematically illustrates a combined communication system 20 supporting automated activation and onboarding of connected devices, in accordance with an embodiment that is described herein.

Combined communication system 20 comprises a cellular network 22 that provides communication and other services to various types of communication devices such as connected devices 24 and mobile terminals 28. In the present example, connected devices 24 comprises a wireless device that communicates wirelessly over cellular network 22. Communication over cellular network 22 is carried out using a base station (BS) 30, which transmits wireless signals to and receives wireless signals from connected devices 24 and mobile terminals 28, using antennas 32. Wireless communication via BS 30 is carried out using any suitable communication protocol, such as, for example, the Universal Mobile Telecommunications System (UMTS) or the Long-Term Evolution (LTE) of the Third Generation Partnership Project (3GPP).

Mobile terminal 28, which in UMTS and LTE is also referred to as User Equipment (UE), may comprise any suitable mobile device such as a smartphone or tablet. Connected devices 24 may comprise any suitable type of connected devices such as, for example, Internet of Things (IoT) devices, home automation devices, wearable devices, tracking devices and the like. Using connected devices 24, combined communication system 20 may be used in various applications such as, for example, consumer applications such as smart home and elder care, commercial applications such as healthcare and transportation control, industrial applications such as remote metering and monitoring, to name a few.

Connected devices 24 typically comprise low-complexity devices that are controlled and interact with other devices or servers over the Internet (or other data network.) Connected devices 24 typically have no friendly user interface such as a keyboard and display.

Cellular network 22 comprises a management server 40, which among other tasks, manages connectivity policies for handling the connectivity of connected devices 24 to the cellular network, and to a data network 44 that is coupled to the cellular network. Data network may comprise any suitable packet network operating using any suitable communication protocol such as the Internet Protocol (IP). In some embodiments, data network 44 comprises the Internet.

For each connected device 24, management server 40 holds a unique device identifier (ID) that is linked to a service plan assigned to that connected device in the cellular network. In some embodiments, the device ID comprises the International Mobile Subscriber Identity (IMSI). In some embodiments, the service plan is associated with a Service Level Agreement (SLA) and with a payment method. When connected to the cellular network, connected device 24 receives communication services and other services in accordance with the service plan to which it has been assigned.

To access data network 44, connected device 24 transmits its device ID to the cellular network. Management server 40 uses the device ID (e.g., IMSI) to identify the connected device, and applies an authentication protocol that on the device side relies on the key in the SIM, for authenticating the connected device as a valid subscriber. A connected device that has been validated by the management server is granted access to data network 44 and to various services in accordance with the assigned service plan.

In some embodiments, after onboarding, the connected device has access, over the data network, to various applications running on application servers 48. In the present example, application servers 48 are comprised in an application cloud 52, which is accessible by both onboarded connected devices 24 and an owner 56 (end user) of the connected devices.

As an example, consider a tracking application scenario, in which connected devices 24 may transmit tracking information to an application running on application server 48, via cellular network 22 and data network 44. The tracking information comprises, for example, location and time reports. The application collects reports from multiple connected devices, and processes the reports, e.g., for analysis and display. Owner 56 may access the application server, for tracking vehicles in which the connected devices are mounted.

In some embodiments, a connected device may access data network 44 (and elements connected to the data network) using a communication link other than cellular network 22. In the example of FIG. 1, connected device 24 may connect to data network 44 wirelessly using a Wi-Fi Access Point (AP) 58, in an embodiment. In alternative embodiments, a connected device may connect to the data network using any other suitable wireless communication protocol such as Bluetooth, the Long Range (LoRa), Sigfox or Narrowband IoT (NB-IoT). Alternatively or additionally, connected device 24 may connect to the data network using a wired connection.

Combined communication system 20 comprises a token server 60 and a token management server 64 for handling onboarding tokens. Token management server may communicate with token server 60 over data network 44, or using a dedicated communication link 66, e.g., a wired link. In some embodiments, token management server 64 runs a portal application, via which owner 56 may purchase a token for a predefined number (quota) of connected devices. The token is used for onboarding connected devices to a selected service plan in the cellular network, as will be described in detail below.

Example Structures of Connected Device and Token Server

Figure 2:
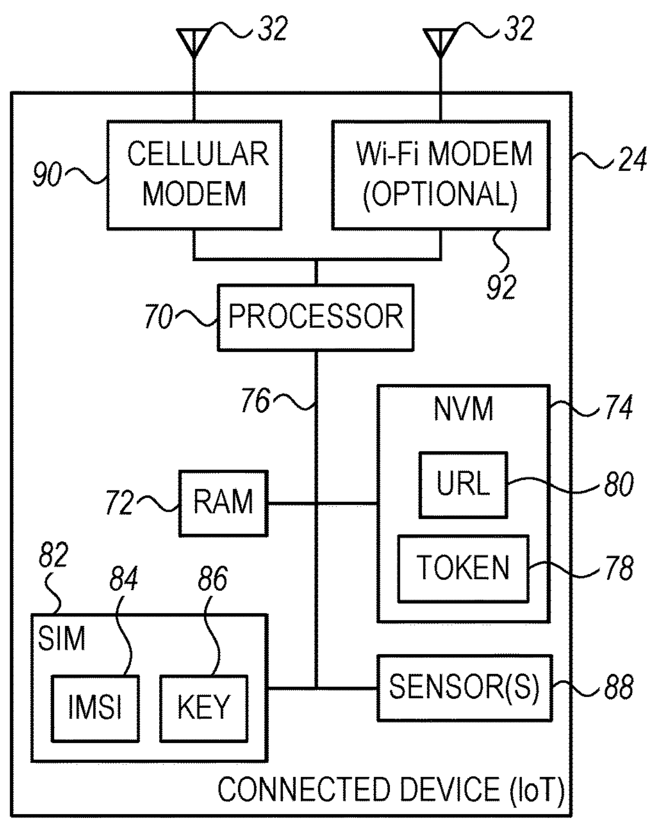
FIG. 2 is a block diagram that schematically illustrates a connected device operable in the combined communication system of FIG. 1, in accordance with an embodiment that is described herein.

FIG. 2 is a block diagram that schematically illustrates connected device 24 operable in combined communication system 20 of FIG. 1, in accordance with an embodiment that is described herein.

Connected device 24 comprises a processor 70 that carries out the various tasks of the connected device. Processor 70 is coupled to a volatile memory 72 such as a Random Access Memory (RAM), and to a Nonvolatile Memory (NVM) 74, using any suitable bus 76. NVM 74 may be implemented using any suitable storage technology. For example NVM 74 may comprise a Flash memory. Processor 70 typically executes a program stored in NVM 74.

In some embodiments, NVM 74 stores a token 78 that specifies information for onboarding the connected device to the cellular network, as will be described in detail below. In the present example, NVM 74 additionally stores a Uniform Resource Locator (URL) 80. Alternatively or additionally, token 78, URL 80 or both, may be stored in volatile memory 72. When connected to the cellular network, connected device 24 may access token server 60 via data network 44, using URL 80.

In the present example, connected device 24 comprises a Subscriber Identification Module (SIM) 82, which may be provided to a manufacturer of the connected device, e.g., by a SIM vendor. In some embodiments, SIM 82 comprises an Integrated Circuit (IC) that holds various types of information including a unique International Mobile Subscriber Identity (IMSI) 84 and a key 86, which are typically assigned to the SIM during a personalization process. The IMSI and key are respectively used for identifying and authenticating the SIM (and therefore the respective connected device) by the cellular network. In some embodiments, the SIM comprises a sub-system that internally comprises various elements such as a processor, NVM, RAM, cryptographic accelerator(s) and the like. These example elements of the SIM are omitted from FIG. 2 for clarity.

In some embodiments, connected device 24 comprises no SIM (a SIMLESS device) in which case IMSI 84 and key 86 may be stored in NVM 74 and/or RAM 72.

IMSI 84 typically comprises multiple digits (e.g., on the order of 16 digits) including a Mobile Country Code (MCC), a Mobile Network Code (MNC) and a Mobile Subscriber Identification number (MSIN). Key 86 comprises a cryptographic key, which is used by the cellular network for authenticating the SIM. Key 86 may comprise any suitable number of bits, such as, for example, 128 bits.

In some embodiments, connected device 24 comprises one or more sensors 88 that are accessible by processor 70. Sensors 88 may reside within or externally to the connected device. The functionality of sensor 88 is application dependent. For example, sensor 88 may provide temperature measurements, metering information, location information and the like. An onboarded connected device that is linked to a selected service plan in the cellular network, may report information provided by the sensor(s) to an application server 48, via the cellular network and the data network.

Connected device 24 comprises a cellular modem 90 that exchanges wireless signals with BS 30 using antenna 32. In the present example, the connected device may additionally comprise a Wi-Fi modem 92 coupled to antenna 32, for wirelessly accessing the data network (e.g., token server 60) independently of being connected to or disconnected from the cellular network.

Figure 3:
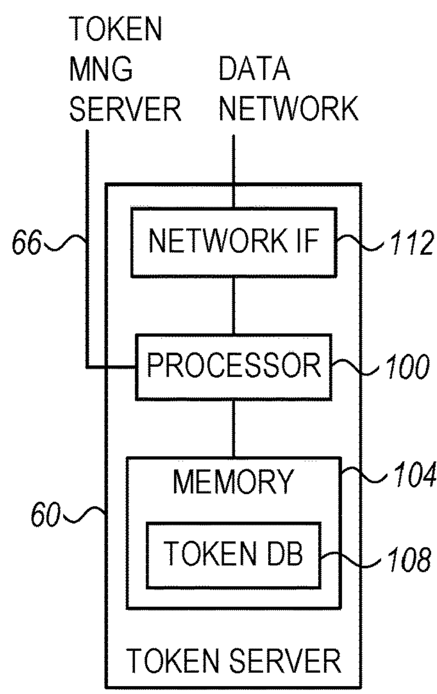
FIG. 3 is a block diagram that schematically illustrates a token server operable in the combined communication system of FIG. 1, in accordance with an embodiment that is described herein.

FIG. 3 is a block diagram that schematically illustrates token server 60 operable in combined communication system 20 of FIG. 1, in accordance with an embodiment that is described herein. Token server 60 provides tokens for onboarding the connected devices, using an out of band process. The token server additionally handles the onboarding of connected devices previously provided with a token, and supports management of onboarded connected devices.

Token server 60 comprises a processor 100 that carries out the various tasks of the token sever, as will be described below. Processor 100 is coupled to a memory 104 that stores a token database (DB) 108. Memory 104 may comprise any suitable type of memory such as, for example, a RAM. Token database 108 stores tokens in association with connected devices that have completed the process of onboarding to the cellular network. Token server 60 (and processor 100 in particular) connects to data network 44 using a network interface 112, which may comprise, for example, a Network Interface Controller (NIC), or any other suitable network interface.

In some embodiments, token server 60 is remotely accessible over data network 44. For example, in performing onboarding, a connected device may send to the token server a previously provided and embedded token 78, over the data network, using URL 80. In some embodiments, the token server communicates with token management server 64 over data network 44 or via dedicated communication link 66. In some embodiments, token server 60 supports modifying as well as canceling service plans assigned to onboarded connected devices.

The configuration of combined communication system 20, connected device 24 and token server 60 of FIGS. 1-3 are given by way of example, which are chosen purely for the sake of conceptual clarity. In alternative embodiments, any other suitable combined communication system, connected device and token server configurations can also be used. Some elements of connected device 24 and of token server 60, such as processor 70, SIM 82 and processor 100, may be implemented in hardware, e.g., in one or more Application-Specific Integrated Circuits (ASICs) or Field-Programmable Gate Arrays (FPGAs). Additionally or alternatively, some elements of connected device 24 and of token server 60 can be implemented using software, or using a combination of hardware and software elements.

In some embodiments, some of the functions of each of processors 70 and 100, may be carried out by a general-purpose processor, which is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

In the context of the present patent application and in the claims, the term "circuitry" refers to all of the elements of connected device 24 excluding cellular modem 90, Wi-Fi modem 92 and sensor(s) 88. In FIG. 2, the circuitry comprises processor 70, RAM 72, NVM 74, SIM 82 and bus 76.

Automated Activation and Onboarding

Figure 4:
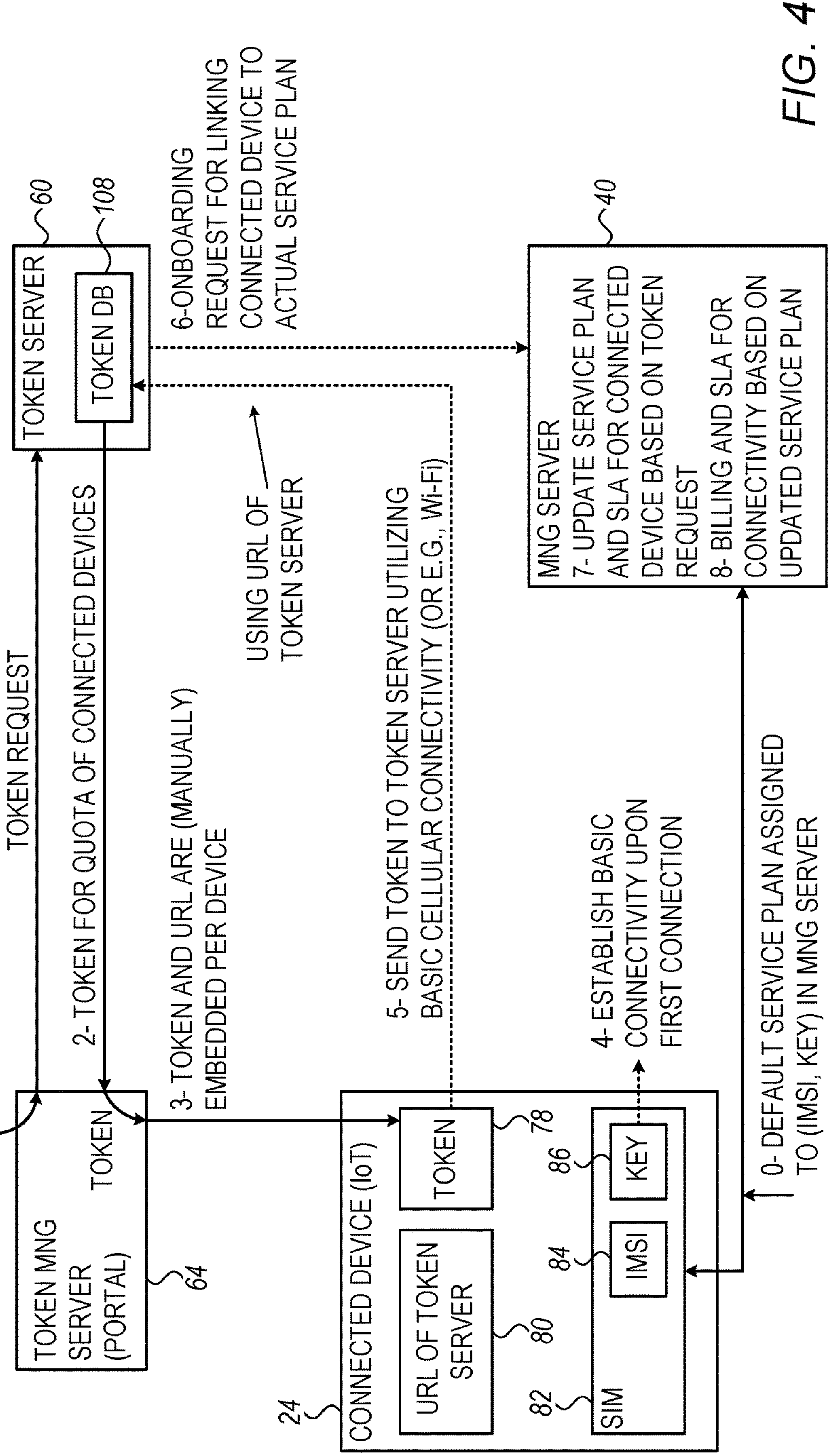
FIG. 4 is a diagram that schematically illustrates an automated process for activation and onboarding of connected devices, carried out by various elements of the combined communication system of FIG. 1, in accordance with an embodiment that is described herein.

FIG. 4 is a diagram that schematically illustrates an automated process for activation and onboarding of connected devices, carried out by various elements of the combined communication system of FIG. 1, in accordance with an embodiment that is described herein.

The main elements of combined communication system 20 that are involved in the automated process comprise connected device 24, token server 60, token management server 64, and management server 40 of the cellular network.

The automated process will be described as a sequence of steps. In the diagram of FIG. 4, interactions among the various elements are depicted as solid and dotted lines. A solid line denotes out of band interaction related to a token provisioning phase, whereas a dotted line denotes interaction related to an automatic onboarding phase using the token server.

At a default plan assignment step 0, the operator of the cellular network provides IMSIs to the SIM vendor. The SIM vendor returns to the operator the IMSIs and corresponding keys (e.g., in a suitable file) to be stored in management server 40. The management server initially associates the reported IMSIs with a default service plan that enables limited connectivity to the cellular network. For example, a connected device whose IMSI has been reported (by the SIM vendor) to the management server, may have limited access over data network 44, e.g., only to token server 60, for onboarding, as will be described below.

In a typical scenario, the SIM vendor first receives from the operator of the cellular network a pool of multiple IMSIs. The SIM vendor generates a corresponding key for each IMSI in the pool, and reports the used IMSIs and keys to the operator of the cellular network, e.g., in a file, as described above. The SIM vendor uses pairs of IMSIs and keys in manufacturing personalized SIM cards such as SIM 82.

At a plan selection step 1, the actual service plan is selected, e.g., by owner 56 or by the manufacturer of the connected device on behalf of owner 56. At step 1, the service plan is typically selected for multiple connected devices whose identities are not yet known. In some embodiments, selecting an actual service plan is carried out via a portal application in token management server 64. In some embodiments, the portal presents (e.g., visually) the various service plans offered by the cellular network operator. Each service plan is typically associated with (i) a Service Level Agreement (SLA), (ii) an expiry date—when the service plan is pre-paid, and (iii) a payment method such as credit card details. In some embodiments, the service plan is additionally associated with advanced services such as applications running on target application servers 48, e.g., in application cloud 52.

In some embodiments, the owner (or manufacturer) of the connected device purchases via the portal, a token for the selected plan that will be used later for onboarding up to a selected quota of connected devices. At step 1, in response to selecting the service plan and purchasing the token, token management server 64 sends a suitable token request to token server 60.

At a token reception step 2, token management server 64 receives a token that was generated by token server 60 in response to the token request of step 1, for the requested quota. The generated token may comprise, for example, a string of characters and may be delivered to the owner (or manufacturer) using any suitable interface. In some embodiments, the token server generates the token with a signature that can be used by the token server to verify that the token is its own generated token, and for checking the integrity of the token content. In an example embodiment, token management server 64 may display the token string using the portal. Alternatively or additionally, the token management server sends the token to the owner (or manufacturer) e.g., using a file of any suitable type.

The token provided by token server 60 specifies the selected service plan, account/paying customer, and optionally cloud applications to which a connected device that possesses that token is granted. Token server 60 stores the token (and token signature) in association with the service plan and quota in token database 108. Note that at this stage, the token is not yet linked to any specific connected device.

Steps 1 and 2 above are typically performed once for multiple (up to the quota) connected devices that share a common service plan in the cellular network, and the same services of the application cloud.

At an embedding step 3, the token generated by the token server at step 2 is provided to the manufacturer of the connected device. In some embodiments, the manufacturer embeds the token data within the software of the connected device, e.g., in a business-logic layer, as token 78. In some embodiments, the manufacturer additionally embeds a URL within the software of the connected device, which URL is used for accessing token server 60 for onboarding the connected device. The URL may be provided to the manufacturer, for example, via the portal of the token management server, or using any other suitable method. The manufacturer embeds the URL provided within the software of the connected device, as URL 80.

At a connection establishment step 4, the connected device attempts connecting to the cellular network, by transmitting IMSI 84 to management server 40, which validates the subscriber based on the key information in the SIM. At step 4, the connected device is not yet onboarded. This means that even though the connected device is validated by management server 40, the connected device is currently linked to a default service plan that provides basic connectivity, but is not yet linked in management server 40 to the service plan selected at step 1 above.

To trigger onboarding, the connected device transmits token 78, along with additional parameters such as the device's IMSI, to token server 60 using URL 80, by utilizing the basic connectivity enabled by the default service plan, at a token transmission step 5. In response to receiving the token, the token server checks, in token database 108, whether the quota assigned to this token (e.g., at step 2 above) is fully exploited. When the quota is not fully exploited, the token server associates, in token database 108, between the token and the IMSI of the connected device (the selected service plan is already assigned to the token) and updates the quota usage. The remaining quota for the token can be checked, for example, via the portal of the token management server. Otherwise, the quota is fully exploited, and the token server issues a quota error message to the token management server.

At an onboarding requesting step 6, token server 60 sends an onboarding request to management server 40. The token server generates the onboarding request based on the token data in token 78. The onboarding request specifies the user account and application cloud services to which the connected device identified by IMSI 84 is granted. The onboarding request may comprise information such as, for example, IMSI of the connected device, the corresponding user account in the cellular network and the assigned service plan and SLA.

At an onboarding step 7, in response to the onboarding request, management server 40 replaces the default service plan currently assigned to the connected device, with the actual service plan that was selected at step 1 and that is specified in the onboarding request. In some embodiments, management server 40 notifies the token server that the onboarding process has completed successfully, or possibly failed, (not shown). In an embodiment, the management server sends to token server 60 a message that indicates whether the onboarding has been successful or failed. Step 7 concludes the automated onboarding phase. In some embodiments, the connected device needs to be disconnected from the cellular network and then reconnect, in order to be actually onboarded.

At a post-onboarding step 8, the connected device is already onboarded, and therefore communication transactions with the connected device are handled in accordance with the actual service plan to which the connected device is linked. The management server thus provides services to the connected device in accordance with the SLA of the service plan. The management server additionally tracks the communication transactions between the connected device and application servers 48, and bills owner 56, accordingly.

The process described in FIG. 4 is given by way of example, and other suitable processes can also be used. For example, at step 5 above, the connected device sends the embedded token (78) to token server 60 via the cellular network (and data network) by first establishing basic connectivity in the cellular network as described at step 4 above. In alternative embodiments, the connected device sends the embedded token to the token server using a communication link other than the cellular network, e.g., using Wi-Fi modem 92. Step 4 in FIG. 4 may be skipped when the connected device transmits token 78 to the token server using a wireless or wired link other than the cellular network.

In the embodiments described above, the connected device sends the embedded token to the token server. Based on parsing the token data, the token server generates a corresponding onboarding request, and sends the onboarding request to management server 40. In alternative embodiments, the connected device transmits an onboarding request to the management server using the basic connectivity established at step 4. The onboarding request in such embodiments, may comprise the embedded token (78) itself, or alternatively generated by the connected device based on the embedded token data. In response to the onboarding request, management server 40 links the connected device to the selected service plan, as described above, and sends an onboarding notification to the token server. Such notification contains at least the IMSI of the connected device and the corresponding service plan assigned. In response to the notification, the token server associates between the token and the device's IMSI, in token database 108, and updates the quota of that token, as described above.

Onboarding of a given connected device is typically performed once, e.g., when the connected device connects to the cellular network for the first time. In some embodiments, the connected device receives a notification of being successfully onboarded.

Managing Connected Devices in the Token Server

In some embodiments, owner 56 manages connected devices that are already onborded and registered in token database 108 of token server 60. In the description that follows, owner 56 may communicate with token server 60 directly via data network 44, or indirectly, e.g., via the portal of token management server 64.

Figure 5:
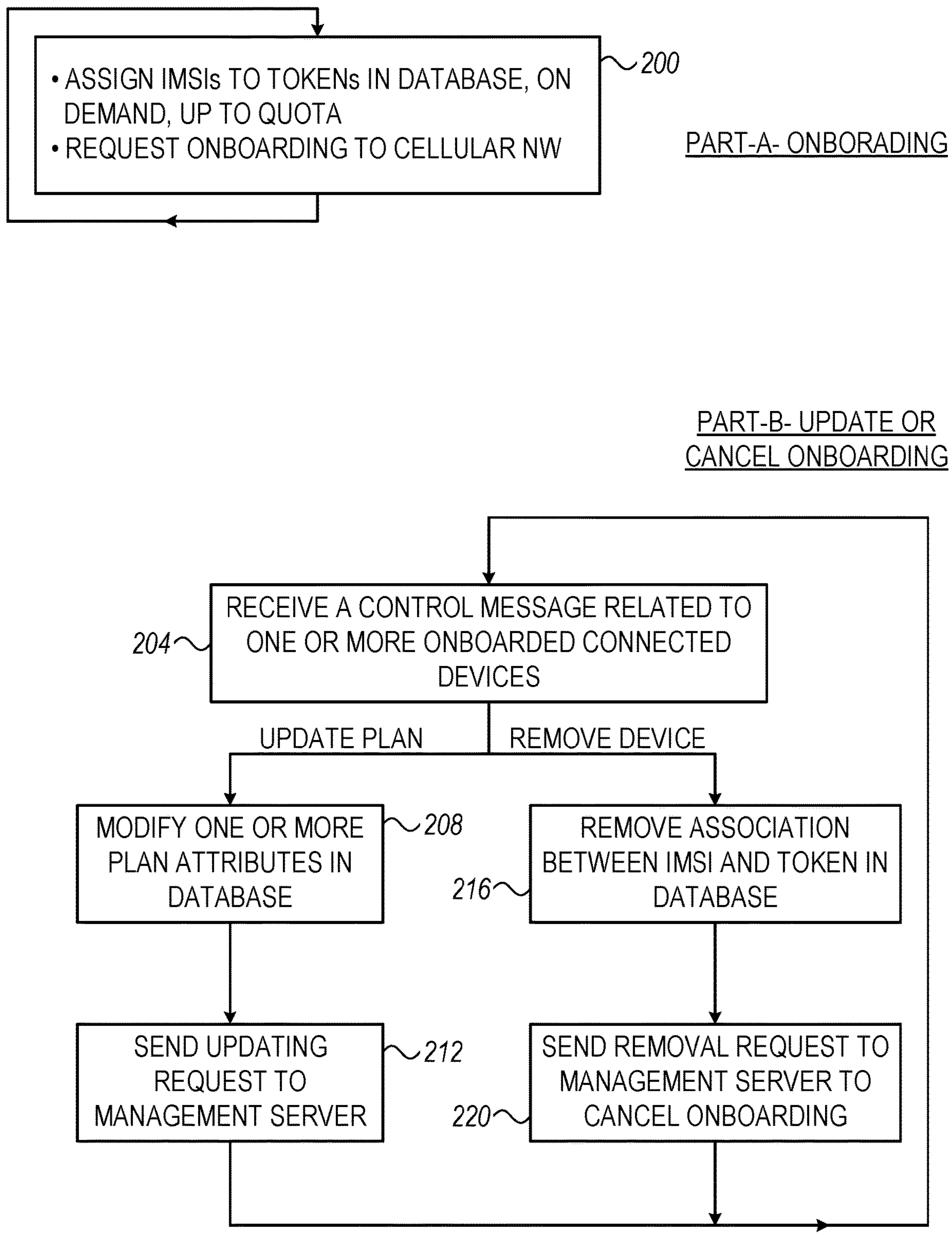
FIG. 5 is a flow chart that schematically illustrates a method for onboarding and managing onboarded connected devices, in accordance with an embodiment that is described herein.

FIG. 5 is a flow chart that schematically illustrates a method for onboarding and managing onboarded connected devices, in accordance with an embodiment that is described herein. The method will be described as being executed by processor 100 of token server 60. The method is partitioned into two parts denoted PART-A and PART-B, which processor 100 executes in parallel.

PART-A of the method begins, at an onboarding step 200, with processor 100 of the token server handling onboarding of connected devices 24 by registering in token database 108 the IMSIs of the connected devices in association with relevant tokens, as described, e.g., with reference to FIG. 4 above. Processor 100 assigns each connected device to a relevant token, and requests management server 40 to onboard the connected device by linking the connected device to the relevant service plan, up to a selected quota. An onboarded connected device is associated in token database 108 with the token that was used for onboarding that connected device. In some embodiments, e.g., when using a pre-paid scheme, the token is also associated with an expiry date in the database.

PART-B of the method begins with processor 100 of the token server receiving a control message, e.g., from owner 56, at a message reception step 204. In the present example, the control message may comprise an update message or an onboarding cancellation message. Alternatively or additionally, other suitable control messages can also be used. In some embodiments, the token server (or the portal in token management server) provides a user interface application (e.g., a dashboard) that enables the owner to manage his or her onboarded devices. For example, the owner may check the status of the owned connected devices and choose actions to apply such as removing an onboarded device, modifying a service plan and the like.

An update message specifies modifying one or more of the plan attributes assigned to a given connected device (or to multiple connected devices.) The update message may specify, for example, the ID (e.g., IMSI) of the given connected device, and one or more attributes of the service plan to be modified. In some embodiments, the update message specifies an updated service plan, e.g., by specifying a different SLA for replacing the SLA currently used, extending the service plan duration, adding or removing one or more application services, and/or using a different payment method. At a modification step 208, processor 100 modifies the relevant attributes of the service plan assigned to the connected device in the token database. Processor 100 additionally sends to management server 40, an updating request that includes the IMSIs of one or more connected devices plus the required modifications, at a modification requesting step 212.

In some embodiments, the control message received at step 204 comprises an onboarding cancellation message, for excluding one or more connected devices registered in token database 108 and onboarded in management server 40. In response to the onboarding cancellation message for a given IMSI, processor 100 removes the association in the token database between the given IMSI and the token that was used for onboarding that connected device, at a removal from database step 216. The processor updates the quota of the relevant token, e.g., by increasing the quota by a unit for each connected device that has been removed.

At a removal requesting step 220, processor 100 sends to management server 40 a removal request that includes the IMSI of the relevant connected device. In response to the removal request, the management server removes the association between the IMSI and the service plan to which the connected device is assigned, after which the connected device is no longer onborded to the cellular network. In some embodiments, the onboarding cancellation message and/or the removal request may specify canceling the onboarding of multiple connected devices.

Following each of steps 212 and 220 the method loops back to step 204, to receive a subsequent control message.

The embodiments described above are given by way of example, and other suitable embodiments can also be used.

Although the embodiments described herein mainly address automated token-based onboarding to a cellular network, the methods and systems described herein are also applicable to onboarding to other suitable types of communication networks, e.g., wired communication networks, using similar token-based techniques.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication device, comprising:

a modem for communicating with a cellular network that is linked to a data network to which one or more target servers are coupled; and circuitry, configured to:

hold a device identifier;

hold a token that identifies a selected service plan in a management server of the cellular network, and an address of a token server for performing onboarding;

transmit the device identifier to the management server in order to access services of the data network;

upon first connecting to the cellular network, transmitting the token to the address of the token server for assigning the selected service plan to the communication device; and after the selected service plan has been assigned to the communication device in the management server, communicate with a target server, via the cellular network and over the data network, in accordance with the selected service plan.

2. The communication device according to claim 1, wherein the circuitry is configured to store the token in a memory of the communication device.

3. The communication device according to claim 1, wherein the circuitry is configured to transmit the token to the token server over the cellular network using a preassigned service plan, subsequently replaced by the selected service plan.

4. The communication device according to claim 1, wherein the circuitry is configured to send the token to the token server via both the cellular network and the data network.

5. The communication device according to claim 1, wherein the circuitry is configured to send the token to the address of the token server via the data network using a wired link or a wireless communication link other than the cellular network.

6. A method, comprising:

in a communication device that communicates with a cellular network that is linked to a data network to which one or more target servers are coupled, holding a device identifier, a token that identifies a selected service plan in a management server of the cellular network, and an address of a token server for performing onboarding;

transmit the device identifier to the management server in order to access services of the data network;

upon first connecting to the cellular network, transmitting the token to the address of the token server for assigning the selected service plan to the communication device; and after the selected service plan has been assigned to the communication device in the management server, communicating with a target server, via the cellular network and over the data network, in accordance with the selected service plan.

7. The method according to claim 6, wherein holding the token comprises storing the token in a memory of the communication device.

8. The method according to claim 6, wherein transmitting the token to the address of the token server comprises sending the token over the cellular network using a preassigned service plan, subsequently replaced by the selected service plan.

9. The method according to claim 6, wherein sending the token to the token server comprises sending the token to the token server via both the cellular network and the data network.

10. The method according to claim 6, wherein sending the token to the token server comprises sending the token to the address of the token server via the data network using a wired link or a wireless communication link other than the cellular network.

11. A token server, comprising:

an interface for connecting to a data network coupled to a cellular network comprising a management server that assigns to communication devices respective service plans;

a memory; and a processor, configured to:

receive a token request for providing a token that specifies a predefined quota of communication devices for assignment to a selected service plan in the management server, and in response to the token request, send a respective token; and upon receiving a given token, previously provided in response to a token request, from a given communication device, store in the memory an identifier of the given communication device and the selected service plan and send an onboarding request to the management server for assigning the selected service plan to the given communication device.

12. The token server according to claim 11, wherein the processor is configured to receive from the management server a notification that the given communication device has been assigned in the management server to the service plan specified by the given token, and in response to the notification, the processor is configured to store the identifier of the given communication device in association with the given token, in the memory.

13. The token server according to claim 11, wherein the processor is configured to receive a request for modifying an attribute in the selected service plan currently assigned to the given communication device, and in response to the request, modify in the memory, the attribute in the selected service plan of the given communication device, and request the management server to modify the attribute in the selected service plan assigned to the given communication device.

14. The token server according to claim 11, wherein the processor is configured to receive a request for canceling the selected service plan currently assigned to the given communication device, and in response to the request, remove in the memory, an association between the given token and the given communication device, and request the management server to remove an assignment of the selected service plan to the given communication device.

15. A method, comprising:

in a token server that connects to a data network coupled to a cellular network comprising a management server that assigns to communication devices respective service plans, receiving a token request for providing a token that specifies a predefined quota of communication devices for assignment to a selected service plan in the management server, and in response to the token request sending a respective token; and upon receiving a given token, previously provided in response to a token request, from a given communication device, storing in a memory an identifier of the given communication device and the selected service plan and sending an onboarding request to the management server for assigning the selected service plan to the given communication device.

16. The method according to claim 15, and comprising receiving from the management server a notification that the given communication device has been assigned in the management server to the service plan specified by the given token, and in response to the notification, storing the identifier of the given communication device in association with the given token, in the memory.

17. The method according to claim 15, and comprising receiving a request for modifying an attribute in the selected service plan currently assigned to the given communication device, and in response to the request, modifying in the memory, the attribute in the selected service plan of the given communication device, and requesting the management server to modify the attribute in the selected service plan assigned to the given communication device.

18. The method according to claim 15, and comprising receiving a request for canceling the selected service plan currently assigned to the given communication device, and in response to the request, removing in the memory, an association between the given token and the given communication device, and requesting the management server to remove an assignment of the selected service plan to the given communication device.

19. A method for onboarding, comprising:

registering in a management server of a cellular network a communication device that requires onboarding;

embedding in the communication device, a token provided by a token server connected to a data network that is coupled to the cellular network, wherein the token identifies a selected service plan to be assigned to the communication device in the management server;

sending the embedded token to the token server, by the communication device;

requesting the management server, by the token server, to onboard the communication device by assigning the selected service plan to the communication device in the management server; and communicating, by the communication device, with an application server accessible via the data network, using the assigned service plan.

20. The method according to claim 19, wherein registering the communication device comprises assigning to the communication device a default service plan, and wherein requesting to onboard the communication device comprises requesting the management server to replace the default service plan with the selected service plan.

* * * * *